US012650838B1

(12) United States Patent
Khalil

(10) Patent No.: US 12,650,838 B1
(45) Date of Patent: Jun. 9, 2026

(54) SYSTEMS AND METHODS FOR REMOTE CLIENT ACCESS TO SERVER-BASED SOFTWARE DEVELOPMENT

(71) Applicant: NVIDIA CORPORATION, Santa Clara, CA (US)

(72) Inventor: Nader Khalil, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 65 days.

(21) Appl. No.: 18/305,721

(22) Filed: Apr. 24, 2023

Related U.S. Application Data

(60) Provisional application No. 63/340,608, filed on May 11, 2022.

(51) Int. Cl.
| | |
|---|---|
| *G06F 8/77* | (2018.01) |
| *G06F 8/65* | (2018.01) |
| *G06F 9/50* | (2006.01) |
| *H04L 9/40* | (2022.01) |
| *H04L 41/0893* | (2022.01) |

(52) U.S. Cl.
CPC .................. *G06F 8/77* (2013.01); *G06F 8/65* (2013.01); *G06F 9/5077* (2013.01); *H04L 41/0893* (2013.01); *H04L 63/0272* (2013.01); *G06F 2212/264* (2013.01)

(58) Field of Classification Search
CPC ............. G06F 2212/264; G06F 9/5077; H04L 41/0893
See application file for complete search history.

(56) References Cited

U.S. PATENT DOCUMENTS

| | | | | |
|---|---|---|---|---|
| 10,782,959 | B1 * | 9/2020 | Schambureck | ........... G06F 8/71 |
| 10,922,064 | B2 | 2/2021 | Wei et al. | |
| 10,938,641 | B1 * | 3/2021 | Fritz | ................... H04L 41/0856 |
| 11,108,629 | B1 * | 8/2021 | Cahyadi | .............. G06F 9/45558 |
| 11,599,376 | B1 | 3/2023 | Viswanathan et al. | |

(Continued)

FOREIGN PATENT DOCUMENTS

EP          2775397 A2 *   9/2014   ............. G06F 40/10

OTHER PUBLICATIONS

Valstar, Sander, et al., Using DevContainers to Standardize Student Development Environments: An Experience Report, Proceedings of the 2020 ACM Conference on Innovation and Technology in Computer Science Education, Jun. 2020, 8 pages, [retrieved on Jan. 30, 2026], Retrieved from the Internet: <URL:http://dl.acm.org/>.*

*Primary Examiner* — Geoffrey R St Leger
(74) *Attorney, Agent, or Firm* — Foley & Lardner LLP

(57) ABSTRACT
Systems and methods to support remote client access to server-based software development within a server that manages a container cluster, are disclosed. Exemplary implementations may launch one or more pods that may include sets of containers, including a first pod that executes a container management software application; launch a first set of containers including a first container; receive a connection instruction to establish a secure channel between a client computing platform and a remotely-accessible server-based software development environment (SDE) in the first container; establish the secure channel; receive user input for particular execution in the remotely-accessible server-based software development environment; perform the particular execution; and/or other actions.

19 Claims, 2 Drawing Sheets

(56)         References Cited

U.S. PATENT DOCUMENTS

| 11,811,878 | B1 * | 11/2023 | Van Henten .......... H04L 67/146 |
| 12,032,977 | B2 | 7/2024 | Rodriguez et al. |
| 12,141,554 | B2 | 11/2024 | Masad et al. |
| 2013/0347077 | A1 * | 12/2013 | Marum ............ G06Q 10/06311 |
| | | | 726/4 |
| 2017/0244593 | A1 | 8/2017 | Rangasamy et al. |
| 2019/0028336 | A1 | 1/2019 | Coronado et al. |
| 2019/0065619 | A1 | 2/2019 | Kuo et al. |
| 2019/0260855 | A1 * | 8/2019 | Thomas .................. G06F 9/452 |
| 2019/0318240 | A1 | 10/2019 | Kulkarni et al. |
| 2021/0103499 | A1 | 4/2021 | Alluboyina et al. |
| 2021/0174248 | A1 | 6/2021 | Wetherbee et al. |
| 2022/0138004 | A1 | 5/2022 | Nandakumar |
| 2022/0391124 | A1 | 12/2022 | Darji et al. |
| 2022/0391176 | A1 | 12/2022 | Gupte et al. |
| 2022/0417215 | A1 | 12/2022 | Parthasarathi et al. |
| 2023/0266989 | A1 | 8/2023 | Van Welzen et al. |
| 2023/0359457 | A1 | 11/2023 | Van Der Hoorn et al. |
| 2023/0409528 | A1 | 12/2023 | Chirayath et al. |
| 2024/0184897 | A1 | 6/2024 | Yin et al. |
| 2024/0411544 | A1 | 12/2024 | Vijaywargiya et al. |

* cited by examiner

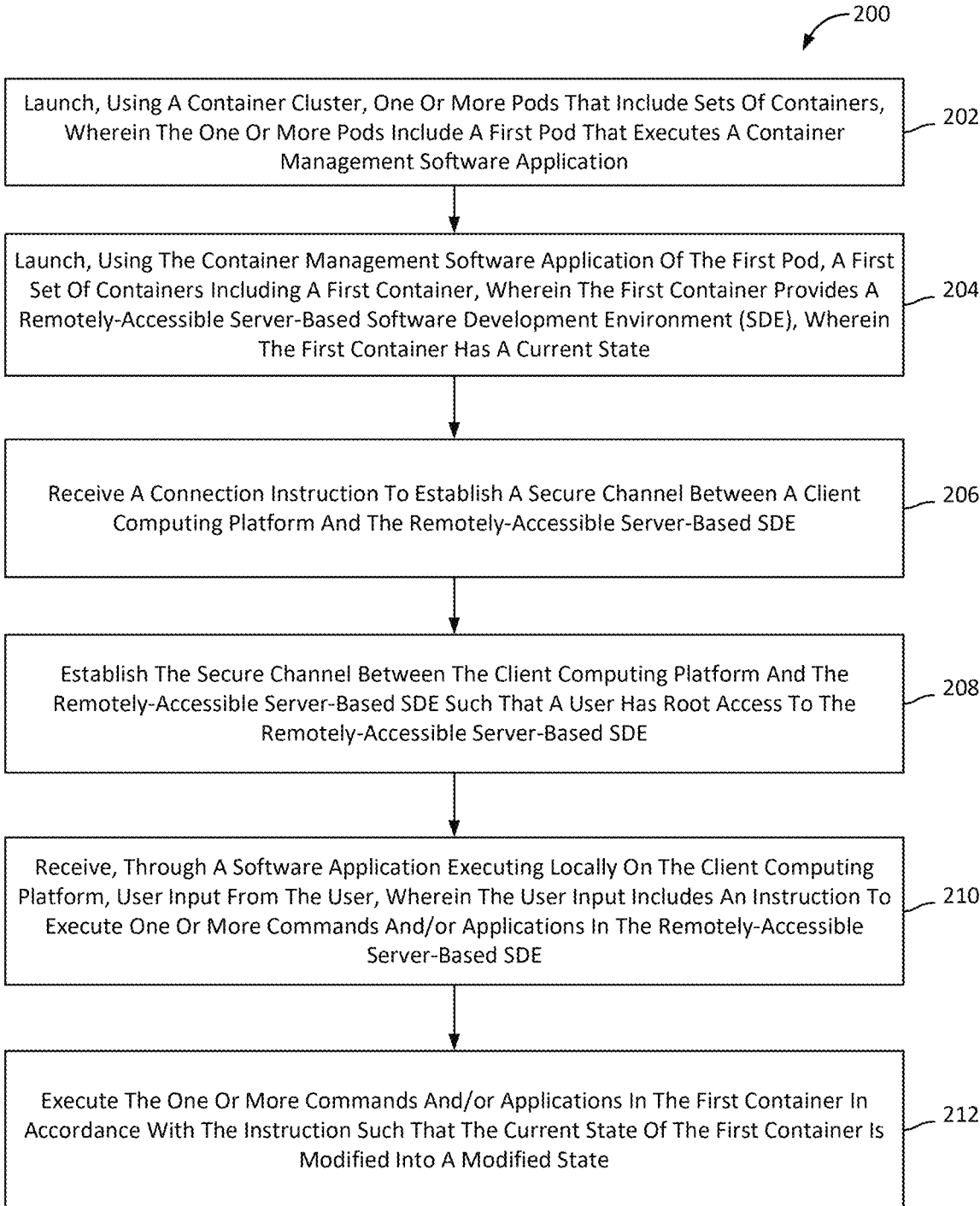

200

Launch, Using A Container Cluster, One Or More Pods That Include Sets Of Containers, Wherein The One Or More Pods Include A First Pod That Executes A Container Management Software Application — 202

Launch, Using The Container Management Software Application Of The First Pod, A First Set Of Containers Including A First Container, Wherein The First Container Provides A Remotely-Accessible Server-Based Software Development Environment (SDE), Wherein The First Container Has A Current State — 204

Receive A Connection Instruction To Establish A Secure Channel Between A Client Computing Platform And The Remotely-Accessible Server-Based SDE — 206

Establish The Secure Channel Between The Client Computing Platform And The Remotely-Accessible Server-Based SDE Such That A User Has Root Access To The Remotely-Accessible Server-Based SDE — 208

Receive, Through A Software Application Executing Locally On The Client Computing Platform, User Input From The User, Wherein The User Input Includes An Instruction To Execute One Or More Commands And/or Applications In The Remotely-Accessible Server-Based SDE — 210

Execute The One Or More Commands And/or Applications In The First Container In Accordance With The Instruction Such That The Current State Of The First Container Is Modified Into A Modified State — 212

*Fig. 2*

SYSTEMS AND METHODS FOR REMOTE CLIENT ACCESS TO SERVER-BASED SOFTWARE DEVELOPMENT

FIELD OF THE DISCLOSURE

The present disclosure relates to systems and methods for supporting remote client access to server-based software development within a server configured to manage a container cluster.

BACKGROUND

Containers, which are bundles of software applications and the dependencies needed for their code to run, are known. A container may include code, a runtime environment, system tools, libraries, and other elements. Container orchestration platforms (a.k.a. container orchestrators or container cluster managers suitable to operate and scale containerized applications) are known, such as, e.g., KUBERNETES™. Sets of containers that are placed and/or scheduled together are known as pods. For example, a KUBERNETES™ node is a pod.

SUMMARY

Containers are highly portable due to the packaging together of their elements, including code, runtime environments, system tools, libraries, and other elements. In some implementations, containers may include infrastructure services such as storage. Containers may need persistent storage, whether on-premises, in the cloud (e.g., AMAZON WEB SERVICES™ (AWS) cloud storage), and/or other persistent storage. For example, a container may mount a storage volume, and bind the volume mount to a directory. A container cluster (or "cluster") may provide one or more of dynamic container placement, cluster scheduling, labels and replication controllers, connections within a cluster (e.g., using naming resolution), and/or other services. An example of a container platform suitable for creating, deploying, and sharing containers is DOCKER™, which supports the DOCKER ENGINE™ as its runtime environment.

One aspect of the present disclosure relates to a system configured to support remote client access to server-based software development within a server configured to manage a container cluster. The system may include electronic storage, one or more hardware processors configured by machine-readable instructions, and/or other components. The system may be configured to launch, using the container cluster, one or more pods that may include sets of containers. The one or more pods may include a first pod configured to execute a container management software application. The system may be configured to launch, using the container management software application of the first pod, a first set of containers including a first container. The first container is configured to provide a remotely-accessible server-based software development environment (SDE). The first container has a current state. The system may be configured to receive, through a client computing platform associated with a user, a connection instruction to establish a secure channel between the client computing platform and the remotely-accessible server-based SDE. The system may be configured to establish the secure channel between the client computing platform and the remotely-accessible server-based SDE such that the user has root access to the remotely-accessible server-based SDE. The system may be configured to receive, through a software application executing locally on the client computing platform, user input from the user. The user input may include an instruction to execute one or more commands and/or applications in the remotely-accessible server-based SDE. The system may be configured to execute the one or more commands and/or applications in the first container in accordance with the instruction such that the current state of the first container is modified into a modified state.

Another aspect of the present disclosure related to a method of supporting remote client access to server-based software development within a server that manages a container cluster. The method may include launching, using the container cluster, one or more pods that may include sets of containers. The one or more pods may include a first pod that executes a container management software application. The method may include launching, using the container management software application of the first pod, a first set of containers including a first container. The first container provides a remotely-accessible server-based SDE. The first container has a current state. The method may include receiving, through a client computing platform associated with a user, a connection instruction to establish a secure channel between the client computing platform and the remotely-accessible server-based SDE. The method may include establishing the secure channel between the client computing platform and the remotely-accessible server-based SDE such that the user has root access to the remotely-accessible server-based SDE. The method may include receiving, through a software application executing locally on the client computing platform, user input from the user. The user input may include an instruction to execute one or more commands and/or applications in the remotely-accessible server-based SDE. The method may include executing the one or more commands and/or applications in the first container in accordance with the instruction such that the current state of the first container is modified into a modified state.

As used herein, any association (or relation, or reflection, or indication, or correspondency, or correlation) involving servers, processors, client computing platforms, users, containers, pods, clusters, applications, instructions, requests, commands, channels, operations, determinations, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 illustrates a method of supporting remote client access to server-based software development within a server configured to manage a container cluster, in accordance with one or more implementations.

DETAILED DESCRIPTION

Figure 1:
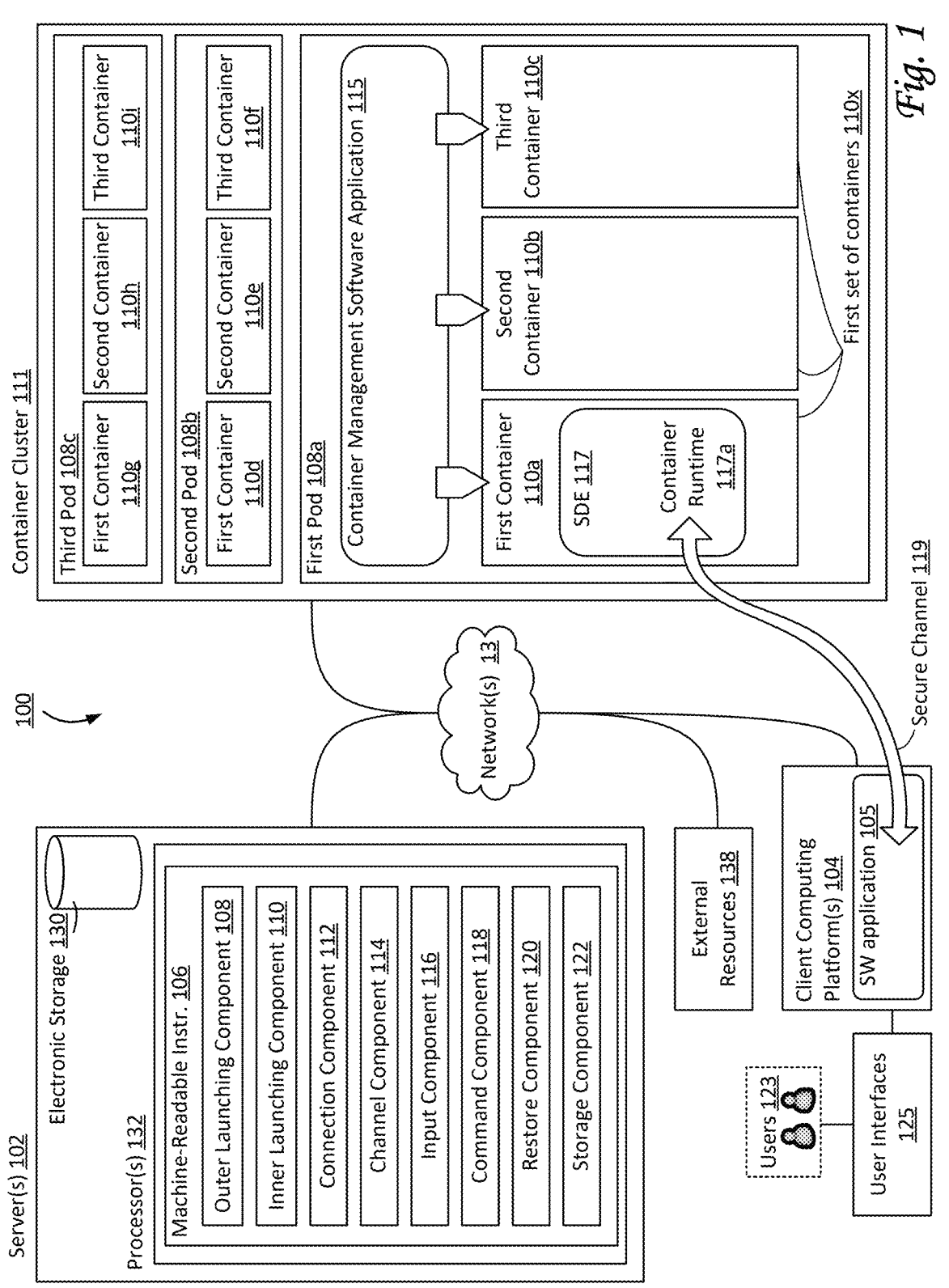
FIG. 1 illustrates a system configured to support remote client access to server-based software development within a server configured to manage a container cluster, in accordance with one or more implementations.

FIG. 1 illustrates a system 100 configured to support remote client access to server-based software development within one or more servers 102 configured to manage a container cluster 111, in accordance with one or more implementations. Remote client access may origination from client computing platform(s) 104, which may be remote from the one or more servers 102. System 100 may include container cluster 111, one or more server(s) 102, client computing platform(s) 104, user interface(s) 125, server(s) 102, external resource(s) 138, and/or other components. Users 123 (also referred to as users) may include one or more of a first user, a second user, a third user, and/or other users. As used in descriptions herein, any use of the term "user" may refer to user(s) 123, unless indicated otherwise.

By virtue of the systems and methods in this disclosure, users may access servers and/or server resources, including but not limited to server-based software development environments (SDEs), from client computing platform(s) 104. These SDEs may be provided by containers that are managed and/or otherwise controlled by container management software applications (by way of non-limiting example, a container platform such as DOCKER™).

Server(s) 102 may be configured to communicate with one or more client computing platforms 104 and with one or more container clusters 111 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, container cluster(s) 111 may be configured to communicate with client computing platforms 104, users 123, external resource(s) 138, and/or other entities and/or components, e.g., through one or more networks 13.

Server(s) 102 may include electronic storage 130, (hardware) processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of an outer launching component 108, an inner launching component 110, a connection component 112, a channel component 114, an input component 116, a command component 118, a restore component 120, a storage component 122, and/or other instruction components.

Outer launching component 108 may be configured to launch or spin up pods that include sets of containers. These pods may be referred to as outer pods. In some implementations, these pods may be orchestrated and/or otherwise managed by a container cluster manager (or a container cluster manager platform) such as, e.g., KUBERNETES. Outer launching component 108 may launch a first pod 108a using container cluster 111. In some implementations, outer launching component 108 may launch a second pod 108b, a third pod 108c, and so forth, using container cluster 111. Launched (outer) pods may be configured to execute one or more container management software applications. Container management software applications may be configured to create, deploy, and/or share containers. In some implementations, container management software applications may provide one or more of dynamic container placement, cluster scheduling, labels and replication controllers, connections within a cluster (e.g., using naming resolution), and/or other services. By way of non-limiting example, a container management software application may be a container platform such as DOCKER™. For example, first pod 108a may be configured to execute a container management software application 115.

Inner launching component 110 may be configured to launch sets of containers. Individual ones of these containers may be referred to as inner containers. Inner launching component 110 may be configured to launch containers using container management software application 115. For example, inner launching component 110 may launch a first set of containers 110x within first pod 108a. In some implementations, inner launching component 110 may launch a second set of containers within second pod 108b, a third set of containers within third pod 108c, and so forth. Within first pod 108a, inner launching component 110 may launch first set of containers 110x, which may include one or more of a first container 110a, a second container 110b, a third container 110c, and so forth. Container management software application 115 may manage individual containers, including first container 110a. Within second pod 108b, the second set of containers may include a first container 110d, a second container 110e, a third container 110f, and so forth. Within third pod 108c, the third set of containers may include a first container 110g, a second container 110h, a third container 110i, and so forth.

Launched (inner) containers may be configured to provide software development environments (SDEs). For example, first container 110a in first pod 108a may be configured to provide a remotely-accessible server-based SDE 117. This SDE 117 may be remotely-accessible from client computing platforms 104. This SDE 117 may be server-based because it uses server 102 and/or resources of server 102. By way of non-limiting example, at least some persistent data for remotely-accessible server-based SDE 117 may be stored on server 102. Alternatively, and/or simultaneously, in some implementations, at least some persistent data for remotely-accessible server-based SDE 117 may be stored using cloud storage.

In some implementations, individual remotely-accessible server-based SDEs may be associated with individual uniform resource locators (URLs). In some implementations, SDE 117a may include a container runtime 117a. For example, container runtime 117a may be a runtime in accordance with an Open Container Initiative (OCI™) specification. For example, container runtime 117*a* may be "runc". SDE 117*a* may support execution of commands and/or (software) applications. A process within SDE 117 may have a current (process) state (which may be maintained by server 102). A data set within SDE 117 may have a current (data set) state (which may be maintained by server 102). An application within SDE 117 may have a current (application) state (which may be maintained by server 102). This SDE 117 may have a current (SDE) state (which may be maintained by server 102). First container 110*a* may have a current (container) state (which may be maintained by server 102). In some implementations, at least some of the current state may be stored in persistent data storage (e.g., provided by server 102). For example, a particular current container state of first container 110*a* may include a deployed (software) application. This deployed application may be accessible to one or more users through a particular (public) URL.

Connection component 112 may be configured to receive instructions. In some implementations, connection component 112 may receive instructions through client computing platforms 104. The received instructions may include connection instructions and/or other instructions. A connection instruction may be an instruction to establish a secure (communication) channel. For example, a particular connection instruction may be to establish a secure channel 119 between a particular client computing platform 104 and remotely-accessible server-based SDE 117. In some cases, connection instructions may be transferred using a (standard) network communication protocol, which may be a cryptographic network protocol so as to provide secure communications even over an unsecured network. For example, a particular connection instruction may be (or may be implemented by) a secure shell command (SSH command). This SSH command may be used to create secure channel 119. In some cases, the particular connection instruction may include and/or otherwise use a specific URL that is specific to SDE 117.

Channel component 114 may be configured to establish and/or otherwise create (communication) channels, including but not limited to secure channels, such as secure channel 119. In some implementations, these channels may extend between client computing platforms 104 and individual containers, including but not limited to first container 110*a*. In some implementations, these channels may extend between client computing platforms 104 and individual pods, including but not limited to first pod 108*a*. Operations by channel component 114 may be based on, e.g., instructions received by connection component 112. In some implementations, channels may be created using SSH commands. By way of non-limiting example, a particular user may provide a connection instruction to connection component 112 to establish secure channel 119 such that the particular user has root access, through this secure channel, to remotely-accessible server-based SDE 117.

Input component 116 may be configured to receive input from users, e.g., through client computing platforms 104. In some implementations, input component 116 may receive particular user input from a particular user through a software application 105 executing locally on a particular client computing platform 104. By way of non-limiting example, software application 105 may provide a command line interface to the particular user, including but not limited to a UNIX-based shell. In some implementations, software application 105 may provide text editing to the particular user, including but not limited to VIM™, EMACS™, GEDIT™, NOTEPADQQ™, text editors similar to one of these, and/or other text editors. For example, particular user input received by input component 116 may include one or more instructions to execute a particular command (in an SDE, e.g., in remotely-accessible server-based SDE 117). Alternatively, and/or simultaneously, particular user input received by input component 116 may include one or more instructions to execute or launch a particular (software) application (in an SDE, e.g., remotely-accessible server-based SDE 117). In some implementations, these instructions may be transferred through a communication channel (e.g., secure channel 119) to remotely-accessible server-based SDE 117. In some implementations, these instructions may be provided to remotely-accessible server-based SDE 117 via a communication channel (e.g., secure channel 119).

In some implementations, particular user input received by input component 116 may include an instruction or command to preserve a particular current state into a preserved state. By way of non-limiting example, this current state may pertain to one or more of a process state, a data set state, an application state, an SDE state, a container state, and/or another type of state within system 100.

Command component 118 may be configured to execute commands and/or (software) applications in a particular container, a particular set of containers, or a particular pod. Execution facilitated by command component 118 may be in accordance with one or more instructions received by input component 116. In some cases, the particular execution of a particular command may modify a current application state (e.g., of an application within SDE 117) into a modified application state. In some cases, the particular execution of a particular command may modify a current SDE state (e.g., of SDE 117) into a modified SDE state. In some cases, the particular execution of a particular command may modify a current container state (e.g., of first container 110*a*) into a modified container state. In some cases, the particular execution of a particular software application may modify a current application state (e.g., of an application within SDE 117) into a modified application state. For example, this modified application state may represent an update to a deployed software application. In some cases, this update of the deployed software application may be (immediately, e.g., within 1 second, or 10 seconds, or 1 minute) accessible to one or more users through the particular (public) URL for the deployed software application. In effect, these modifications provide instantaneous deployment for this software application. In some cases, the particular execution of a particular software application may modify a current SDE state (e.g., of SDE 117) into a modified SDE state. In some cases, the particular execution of a particular software application may modify a current container state (e.g., of first container 110*a*) into a modified container state.

In some implementations, command component 118 may execute a preserve instruction and save a particular current state into a preserved state. In some cases, at least part of this preserved state may be stored in persistent data storage. For example, some or all of this preserved state may be stored in the storage resources of first container 110*a*, of first pod 108*a*, in electronic storage 130, and/or in other storage resources.

Restore component 120 may be configured to receive and execute restore instructions. For example, restore component 120 may receive a particular restore instruction from a particular user. Restore instructions may re-create particular states, particularly preserved states. In some implementations, a particular restore instruction may be to create a particular current state that corresponds to a particular preserved state. In some implementations, a particular restore instruction may be to modify a particular current state into a modified state that corresponds to a particular preserved state.

For example, a particular restore instruction may request the creation or re-creation of a specific state of one or more containers (say, of first set of containers 110x, or of first container 110a in another example, or of SDE 117 more specifically). This specific state may correspond to a particular state as previously preserved. Restore component may be configured to execute the particular restore instruction such that, upon completion of this execution, the current state of first set of containers 110x (or of first container 110a, in another example, or of SDE 117) corresponds and/or otherwise matches the particular state as previously preserved. Due to the ability to easily and quickly preserve and restore a particular current state, system 100 supports access to powerful (server-based) software development.

Storage component 122 may be configured to manage storage within system 100, including but not limited to electronic storage 130, as well as storage resources in container cluster 111. In some implementations, storage component 122 may be configured to store a preserved state in the storage resources of first container 110a, of first pod 108a, in electronic storage 130, and/or in other storage resources.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a group or cloud of computing platforms operating together as server(s) 102.

Referring to FIG. 1, in some implementations, server(s) 102, client computing platform(s) 104, container cluster 111, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which server(s) 102, client computing platform(s) 104, container cluster 111, and/or external resources 138 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. In some implementations, a particular client computing platform 104 may be configured to execute software application 105.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

External resources 138 may include sources of information outside of system 100, external entities participating with system 100 (including third parties such as external web-servers), external providers of computation and/or storage services (e.g., a server external to system 100), external providers of relevant information, and/or other resources. In some implementations, some or all of the functionality attributed herein to external resources 138 may be provided by resources included in system 100. In some implementations, one or more external resources 138 may provide information to other components of system 100.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables system 100 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, and/or 122, and/or other components. Processor(s) 132 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 132 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes only, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 132 may be configured to execute one or more additional components that may perform some or all of the functionality attributed below to one of components 108, 110, 112, 114, 116, 118, 120, and/or 122.

FIG. 2 illustrates a method 200 of supporting remote client access to server-based software development within a server configured to manage a container cluster, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, one or more pods are launched, using a container cluster, the pods including sets of containers. The one or more pods include a first pod that executes a container management software application. In some embodiments, operation 202 is performed by an outer launching component the same as or similar to outer launching component 108 (shown in FIG. 1 and described herein).

At an operation 204, using the container management software application of the first pod, a first set of containers is launched, including a first container. The first container provides a remotely-accessible server-based SDE. The first container has a current state. In some embodiments, operation 204 is performed by an inner launching component the same as or similar to inner launching component 110 (shown in FIG. 1 and described herein).

At an operation 206, a connection instruction is received to establish a secure channel between the client computing platform and the remotely-accessible server-based SDE. The connection instructions is received through a client computing platform associated with a user. In some embodiments, operation 206 is performed by a connection component the same as or similar to connection component 112 (shown in FIG. 1 and described herein).

At an operation 208, the secure channel is established between the client computing platform and the remotely-accessible server-based SDE such that the user has root access to the remotely-accessible server-based SDE. In some embodiments, operation 208 is performed by a channel component the same as or similar to channel component 114 (shown in FIG. 1 and described herein).

At an operation 210, user input is received from the user, through a software application executing locally on the client computing platform. The user input includes an instruction to execute one or more commands and/or applications in the remotely-accessible server-based SDE. In some embodiments, operation 210 is performed by an input component the same as or similar to input component 116 (shown in FIG. 1 and described herein).

At an operation 212, the one or more commands and/or applications are executed in the first container in accordance with the instruction such that the current state of the first container is modified into a modified state. In some embodiments, operation 212 is performed by a command component the same as or similar to command component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to support remote client access to server-based software development within a server configured to manage a container cluster, the system comprising:
   one or more hardware processors configured by machine-readable instructions to: launch, using the container cluster, one or more pods that include at least one set of containers, wherein the one or more pods include a first pod configured to execute a container management software application;
   launch, using the container management software application of the first pod, a first set of the at least one set of containers including a first container and a second container, wherein the first container of the first pod is configured to provide a first remotely-accessible server-based software development environment (SDE) and the second container of the first pod is configured to provide a second remotely-accessible server-based SDE, wherein the first container is associated with a plurality of hierarchical states including at least a current SDE state and a current state of the first container;
   receive, through a public uniform resource locator (URL) accessible from a client computing platform associated with a remote user, a connection instruction to establish a secure channel between the client computing platform and the first remotely-accessible server-based SDE;

establish the secure channel between the client computing platform through the public URL and the first remotely-accessible server-based SDE such that the remote user has root access to the first remotely accessible server based SDE;

receive, through a software application executing locally on the client computing platform, user input from the remote user, wherein the user input includes an instruction to execute one or more commands in the first remotely-accessible server-based SDE; and execute the one or more commands in the first container in accordance with the instruction such that execution of the one or more commands triggers updates across the plurality of hierarchical states including modifying the current state of the first container into a modified state, wherein the modified state corresponds to an update to a deployed software application, wherein the update to the deployed software application is immediately accessible within the first remotely-accessible server-based SDE to one or more different remote users through a resource.

2. The system of claim 1, wherein the container management software application is DOCKER™.

3. The system of claim 1, wherein the connection instruction is received through a Secure Shell (SSH) command.

4. The system of claim 1, wherein the software application executing locally on the client computing platform provides a command line interface to the remote user.

5. The system of claim 1, wherein the software application executing locally on the client computing platform provides text editing to the remote user.

6. The system of claim 1, wherein at least some persistent data for the first remotely-accessible server-based SDE is stored on the server.

7. The system of claim 1, wherein the first remotely-accessible server-based SDE includes a container runtime in accordance with an Open Container Initiative (OCI™) specification.

8. The system of claim 7, wherein the container runtime includes "runc".

9. The system of claim 1, wherein at least some of the current state is stored in persistent data storage, and wherein at least some of the persistent data storage is provided locally by the server.

10. The system of claim 1, wherein the user input received through the software application executing locally on the client computing platform is provided to the first remotely-accessible server-based SDE via the secure channel.

11. The system of claim 1, wherein the one or more commands include a particular command to preserve a particular current state of one or more of:

(i) a particular process running in the first remotely-accessible server-based SDE, (ii) a particular container in the first set of the at least one set of containers, and/or (iii) a particular data set in the first remotely-accessible server-based SDE, into a preserved particular state, wherein the preserved particular state is stored in persistent data storage.

12. The system of claim 11, wherein the one or more hardware processors are further configured to:

receive a particular restore instruction from the remote user for creation and/or modification of a specific current state of the first set of the at least one set of containers, wherein the specific current state corresponds to the preserved particular state; and execute the particular restore instruction such that the first set of the at least one set of containers has a state that corresponds to the preserved particular state.

13. A method of supporting remote client access to server-based software development within a server that manages a container cluster, the method comprising:

launching, using the container cluster, one or more pods that include at least one set of containers, wherein the one or more pods include a first pod that executes a container management software application;

launching, using the container management software application of the first pod, a first set of the at least one set of containers including a first container and a second container, wherein the first container of the first pod provides a first remotely-accessible server-based software development environment (SDE) and the second container of the first pod is configured to provide a second remotely-accessible server-based SDE, wherein the first container is associated with a plurality of hierarchical states including at least a current SDE state and a current state of the first container;

receiving, through a public uniform resource locator (URL) accessible from a client computing platform associated with a remote user, a connection instruction to establish a secure channel between the client computing platform and the first remotely-accessible server-based SDE;

establishing the secure channel between the client computing platform through the public URL and the first remotely-accessible server-based SDE;

receiving, through a software application executing locally on the client computing platform, user input from the remote user, wherein the user input includes an instruction to execute one or more commands in the remotely-accessible server-based SDE; and executing the one or more commands in the first container in accordance with the instruction such that execution of the one or more commands triggers updates across the plurality of hierarchical states including modifying the current state of the first container into a modified state, wherein the modified state corresponds to an update to a deployed software application, wherein the update to the deployed software application is immediately accessible within the first remotely-accessible server-based SDE to one or more different remote users through a resource.

14. The method of claim 13, wherein the container management software application is DOCKER™.

15. The method of claim 13, wherein the connection instruction is received through a Secure Shell (SSH) command.

16. The method of claim 13, wherein the software application executing locally on the client computing platform provides a command line interface to the remote user.

17. The method of claim 13, wherein at least some persistent data for the first remotely-accessible server-based SDE is stored on the server.

18. The method of claim 13, wherein the one or more commands include a particular command to preserve a particular current state of one or more of:

(i) a particular process running in the first remotely-accessible server-based SDE, (ii) a particular container in the first set of the at least one set of containers, and/or (i) a particular data set in the first remotely-accessible server-based SDE, into a preserved particular state, wherein the preserved particular state is stored in persistent data storage.

19. The method of claim 18, further comprising:

receiving a particular restore instruction from the remote user for creation and/or modification of a specific current state of the first set of the at least one set of containers, wherein the specific current state corresponds to the preserved particular state; and executing the particular restore instruction such that the first set of the at least one set of containers has a state that corresponds to the preserved particular state.

\* \* \* \* \*